United States Patent [19]

Schmidt

[11] Patent Number: 5,782,103
[45] Date of Patent: Jul. 21, 1998

US005782103A

[54] CONTROL ARRANGEMENT FOR THE SUPERHEAT TEMPERATURE OF AT LEAST ONE EVAPORATION OF A REFRIGERATION SYSTEM

[75] Inventor: Frede Schmidt, Sønderborg, Denmark

[73] Assignee: Danfoss A/S, Nordborg, Denmark

[21] Appl. No.: 817,814

[22] PCT Filed: Oct. 11, 1995

[86] PCT No.: PCT/DK95/00402

§ 371 Date: Apr. 15, 1997

§ 102(e) Date: Apr. 15, 1997

[87] PCT Pub. No.: WO96/12148

PCT Pub. Date: Apr. 25, 1996

[30] Foreign Application Priority Data

Oct. 15, 1994 [DE] Germany ............ P 44 36 925.5

[51] Int. Cl.$^6$ ..................... F25B 41/04
[52] U.S. Cl. ..................... 62/225; 236/78 D
[58] Field of Search ............ 62/223–225; 236/78 D

[56] References Cited

U.S. PATENT DOCUMENTS 4,571,951  2/1986  Szymaszek .............. 62/212
4,807,445  2/1989  Matsuoka et al. .......... 62/212
5,157,934  10/1992  Uchida .................. 62/212
5,222,371  6/1993  Doyama et al. .......... 62/204
5,259,210  11/1993  Ohya et al. ............. 62/212

Primary Examiner—Henry A. Bennett
Assistant Examiner—Susanne C. Tinker
Attorney, Agent, or Firm—Lee, Mann, Smith McWilliams, Sweeney & Ohlson

[57] ABSTRACT

A control arrangement for the superheat temperature of at least one evaporator of a refrigeration system having a refrigerant circulation, in which at least one compressor, a condenser, an electronically controlled expansion valve and the evaporator are arranged in series, contains a measuring device connected to the evaporator, which device produces a measurement signal Tü that is a measure of the superheat temperature of the refrigerant in the evaporator, a comparator to which the measurement signal Tü and a desired superheat temperature signal Tü$_s$ are arranged to be supplied, and a PID controller arranged between the comparator and the expansion valve. For rapid compensation of changes in the superheat temperature, a control signal S proportional to the evaporation temperature T$_o$ of the refrigerant is arranged to be supplied additionally to the PID controller.

4 Claims, 1 Drawing Sheet

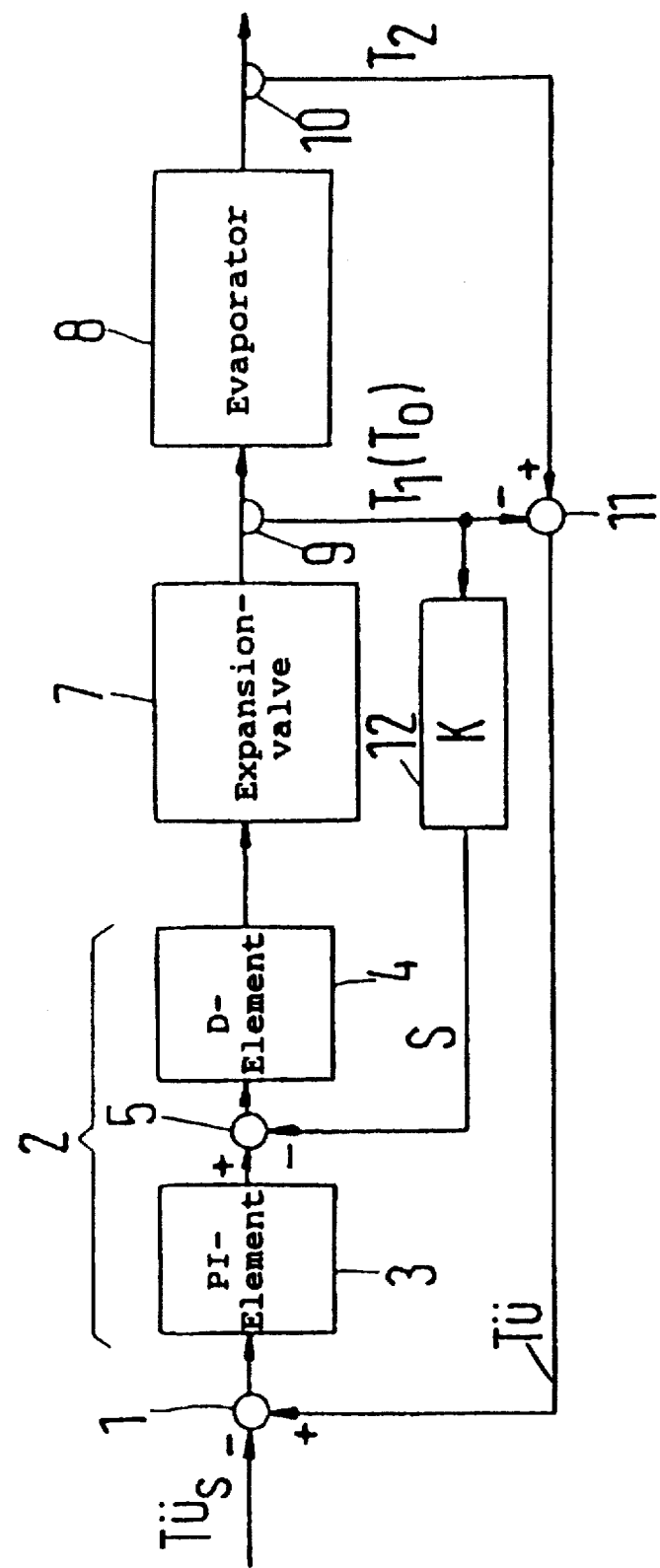

CONTROL ARRANGEMENT FOR THE SUPERHEAT TEMPERATURE OF AT LEAST ONE EVAPORATION OF A REFRIGERATION SYSTEM

BACKGROUND OF THE INVENTION

The invention relates to a control arrangement for the superheat temperature of at least one evaporator of a refrigeration system having a refrigerant circulation, in which at least one compressor, a condenser, an electronically controlled expansion valve and the evaporator are arranged in series, a measuring device being connected to the evaporator, which device produces a measurement signal that is a measure of the superheat temperature of the refrigerant in the evaporator, the arrangement having a comparator to which the measurement signal and a desired superheat temperature signal are arranged to be supplied, and having a PID controller, arranged between the output of the comparator and the control input of the expansion valve, to which the output signal of the comparator is supplied and which controls the expansion valve.

In a known control arrangement of that kind, as a measure of the superheat temperature of the refrigerant in the evaporator, the difference between the input and output temperatures is measured and compared with a desired superheat temperature. The control difference is supplied by way of the PID controller to the expansion valve, which controls the quantity of refrigerant injected into the evaporator.

If the load of the evaporator changes abruptly, for example, because of a sudden change in the ambient temperature of the evaporator or as a consequence of compressors of a group of compressors being switched on and off in steps, the evaporation temperature, which corresponds to the temperature measured at the input of the evaporator or to the evaporation pressure taken as a measure of the evaporation temperature, also changes correspondingly. The superheat temperature consequently also changes, and may fluctuate wildly around the desired value until it is adjusted by the PID controller by way of the expansion valve. It is especially critical if the superheat temperature falls too far below the desired value, because there is then a danger that the refrigerant will still not have evaporated at the output of the evaporator and will be taken up by the compressor.

SUMMARY OF THE INVENTION

The invention is based on the problem of providing a control arrangement of the kind mentioned in the introduction, in which too great a departure of the superheat temperature from the desired value because of a change in load is avoided.

According to the invention, this problem is solved in that a control signal proportional to the evaporation temperature of the refrigerant is arranged to be supplied additionally to the PID controller.

That solution is based on the correlation between the refrigeration output or load Q and the temperature difference between the air temperature $T_a$ at the evaporator and the evaporation temperature $T_o$, that is, $$Q = K \cdot (T_a - T_o).$$

If the evaporation temperature changes, the refrigeration output also changes in accordance with the equation $$\Delta Q = K \cdot \Delta T_o,$$

which results in a corresponding shift in the operating point of the controller. The proportionality factor K can here be between 1 and 5.

The solution according to the invention enables an evaporation temperature change $\Delta T_o$ to effect a corresponding change of level in the degree of opening of the expansion valve, which corresponds to the change in the refrigeration output. The controller therefore counteracts a change in the evaporation temperature initially to a correspondingly great extent, so that the superheat temperature is not able to change wildly either. As soon as the evaporation temperature is no longer changing, its influence by way of the D-element of the PID controller also becomes ineffective, so that only a change in the superheat temperature controls the expansion valve by way of the PID controller.

Preferably, provision is made for the proportionality factor between evaporation temperature and control signal to be selected to be the same as the ratio of the load on the evaporator to the difference between the air temperature at the evaporator and the evaporation temperature.

It is then advantageous for a summation element to which the additional control signal is supplied to be located between a PI-element and a D-element, connected in series therewith, of the PID controller. A change in the evaporation temperature also has an influence here on the expansion valve, so that sudden changes in the evaporation temperature, and thus the superheat temperature, are correspondingly quickly evened out.

BRIEF DESCRIPTION OF THE DRAWINGS

An embodiment of a control arrangement according to the invention is described in greater detail hereinafter with reference to the drawing.

DESCRIPTION OF THE PREFERRED EMBODIMENT

The control arrangement illustrated contains a comparator 1, a PID controller 2, comprising a PI-element 3 with series-connected D-element 4 and a subtractor 5 located between them. The PID controller 2 controls an expansion valve 7, which in turn controls the refrigerant flow from a condenser, not shown, to an evaporator 8 or several evaporators connected in parallel. A compressor, not shown, or several compressors connected in parallel, lies/lie between the output of the evaporator 8 and the input of a condenser, not shown. Additionally connected to the evaporator 8 is a measuring arrangement 9, 10, 11, consisting of two sensors 9, 10 and a subtractor 11. As a measure of the evaporation temperature $T_o$ of the refrigerant in the evaporator 8, the sensor 9 measures the temperature $T_1$ of the refrigerant at the input of the evaporator 8, as illustrated, or the evaporation pressure in the evaporator. The sensor 10 measures the temperature $T_2$ of the evaporated refrigerant at the output of the evaporator 8. The subtractor 11 forms the difference of the two temperatures $T_1$ and $T_2$ and produces as a measure of the superheat temperature corresponding to that difference a measurement signal $Tü$, which is supplied to one input of the comparator 1, whilst a desired superheat temperature signal $Tü_s$ is supplied to the other input of the comparator 1. The control difference of the measured superheat temperature from the desired superheat temperature determined by the comparator 1 controls the expansion valve 7 by way of the PID controller 2 so that the control difference becomes zero. To avoid sudden changes in the superheat temperature, a control signal S proportional to the evaporation temperature $T_o$ or the temperature $T_1$ at the input of the evaporator 8 is supplied by way of a P-element 12 with the proportionality factor or transfer factor K to the subtractor 5. The expansion valve 7 is thus also influenced by the control signal S by way of the D-element 4. That is to say, when the evaporation temperature $T_o$ increases because of too high a load on the evaporator or conversely the load increases because of a change in the evaporation temperature $T_o$, that change in the evaporation temperature $T_o$, and with it also a corresponding change in the superheat temperature, is counteracted again very quickly.

The transfer factor or proportionality factor K of the P-element 12 is selected to be the same as the ratio $Q/(T_a-T_o)$, $T_a$ being the air temperature at the evaporator. Since Q is proportional to the degree of opening D of the expansion valve, and $t_a-T_o$ can be about 15° C., the mean degree of opening $\overline{D}$ to determine K is selected to be $\overline{D}/15$.

I claim:

1. A control arrangement for the superheat temperature of at least one evaporator of a refrigeration system having a refrigerant circulation, in which at least one compressor, a condenser, an electronically controlled expansion valve and the evaporator are arranged in series, a measuring device being connected to the evaporator, which measuring device produces a measurement signal that is a measure of the superheat temperature of the refrigerant in the evaporator, the arrangement having a comparator to which the measurement signal and a desired superheat temperature are supplied, and having a PID controller, arranged between output of the comparator and a control input of the expansion valve, an output signal of the comparator being supplied to the PID controller and the PID controller being connected to the expansion valve, and including a control signal proportional to the evaporation temperature of the refrigerant being supplied to the PID controller, the PID controller having a PI-element and a D-element, the control signal S being supplied to a summation element located between the PI-element and the D-element.

2. A control arrangement according to claim 1, in which a proportionality factor between evaporation temperature and control signal is selected to be the same as the ratio $Q/(T_a-T_o)$ of the load on the evaporator to the difference between air temperature at the evaporator and the evaporation temperature.

3. A control arrangement according to claim 1, in which the summation element is located in series between the PI-element and the D-element.

4. A control arrangement according to claim 1, in which the measuring device comprises a sensor upstream of the evaporator, a sensor downstream of the evaporator, and a subtractor connected to said sensors for producing the measurement signal $T_ü$.

* * * * *